US009273445B2

(12) United States Patent
Minola et al.

(10) Patent No.: US 9,273,445 B2
(45) Date of Patent: Mar. 1, 2016

(54) FLUIDIFIED INERT MATERIAL SPREADING DEVICE FOR BURYING AN UNDERWATER PIPELINE, AND METHOD OF SPREADING FLUIDIFIED INERT MATERIAL OVER AN UNDERWATER PIPELINE

(75) Inventors: Paolo Minola, Peschiera Borromeo (IT); Denis Faidutti, Mortegliano (IT)

(73) Assignee: SAIPEM S.P.A., San Donato Milanese (IT)

(*) Notice: Subject to any disclaimer, the term of this patent is extended or adjusted under 35 U.S.C. 154(b) by 69 days.

(21) Appl. No.: 14/009,482

(22) PCT Filed: Apr. 5, 2012

(86) PCT No.: PCT/IB2012/051710
§ 371 (c)(1),
(2), (4) Date: Dec. 11, 2013

(87) PCT Pub. No.: WO2012/137175
PCT Pub. Date: Oct. 11, 2012

(65) Prior Publication Data
US 2014/0169884 A1    Jun. 19, 2014

(30) Foreign Application Priority Data
Apr. 5, 2011    (IT) .............................. MI2011A0556

(51) Int. Cl.
*E02F 5/12*    (2006.01)
*E02D 15/10*    (2006.01)
(Continued)

(52) U.S. Cl.
CPC ................ *E02F 5/125* (2013.01); *E02D 15/10* (2013.01); *E02F 5/104* (2013.01); *F16L 1/123* (2013.01)

(58) Field of Classification Search
CPC ........... E02F 5/104; E02F 5/105; E02F 5/107; E02F 5/125; E02D 15/10
USPC ..................... 405/158, 159, 161, 163; 37/323
See application file for complete search history.

(56) References Cited

U.S. PATENT DOCUMENTS

| 491,748 | A | * | 2/1893 | Urie ................................ 37/318 |
| 2,067,717 | A | * | 1/1937 | Bloomer et al. ............... 405/164 |

(Continued)

FOREIGN PATENT DOCUMENTS

| EP | 0 322 935 | 7/1989 |
| GB | 2 004 817 | 4/1979 |

(Continued)

OTHER PUBLICATIONS

International Search Report and Written Opinion for International Application No. PCT/IB2012/051710 dated Jun. 25, 2012.

(Continued)

*Primary Examiner* — Tara M. Pinnock
(74) *Attorney, Agent, or Firm* — Neal, Gerber & Eisenberg LLP

(57) ABSTRACT

A fluidified inert material spreading device configured to bury a pipeline in a body of water is configured to travel in the body of water in a travelling direction along and over the pipeline, and has a hull, which extends along a longitudinal axis, houses at least one expansion chamber for fluidified inert material, is connected to at least one feed port to feed the fluidified inert material to the expansion chamber, and has a quantity or number of outlet ports configured to release the fluidified inert material from the expansion chamber, close to the pipeline, and which as a whole define a flow cross section greater than the flow cross section of the feed port.

9 Claims, 3 Drawing Sheets

(51) Int. Cl.
*E02F 5/10* (2006.01)
*F16L 1/12* (2006.01)

(56) References Cited

U.S. PATENT DOCUMENTS

| | | | | |
|---|---|---|---|---|
| 3,916,636 A * | 11/1975 | Wilhelm | ............... | 405/184 |
| 4,266,889 A | 5/1981 | Rail et al. | | |
| 4,334,801 A | 6/1982 | Gray | | |
| 4,342,526 A | 8/1982 | Mousselli | | |
| 4,352,590 A | 10/1982 | Parker et al. | | |
| 4,400,115 A | 8/1983 | Biancale et al. | | |
| 4,470,720 A * | 9/1984 | Lennard | ............... | 405/161 |
| 4,714,378 A * | 12/1987 | Lincoln | ............... | 405/163 |
| 4,991,997 A * | 2/1991 | Cowper | ............... | 405/73 |
| 4,992,000 A | 2/1991 | Doleshal | | |
| 5,237,946 A | 8/1993 | Copson | | |
| 5,659,983 A | 8/1997 | Coutarel et al. | | |
| 6,116,818 A * | 9/2000 | Bitetto et al. | ............... | 405/159 |
| 6,220,786 B1 * | 4/2001 | Ollason et al. | ............... | 405/159 |
| 6,273,642 B1 * | 8/2001 | Anderson | ............... | 405/163 |
| 6,705,029 B2 * | 3/2004 | Anderson | ............... | 37/323 |
| 6,719,494 B1 * | 4/2004 | Machin | ............... | 405/163 |
| 7,520,696 B2 * | 4/2009 | Pihl | ............... | 405/161 |
| 8,834,068 B2 * | 9/2014 | Lazzarin et al. | ............... | 405/171 |

FOREIGN PATENT DOCUMENTS

| | | |
|---|---|---|
| GB | 2 222 425 | 3/1990 |
| JP | S56167034 | 12/1981 |
| WO | WO 02/02979 | 1/2002 |
| WO | WO 2005/005736 | 1/2005 |
| WO | WO 2009/141409 | 11/2009 |
| WO | WO 2010/122395 | 10/2010 |

OTHER PUBLICATIONS

Notification Concerning Submission, Obtention or Transmittal of Priority Document (Form PCT/IB/304) for International Application No. PCT/IB2012/051710 dated Jul. 10, 2012.
Response to International Search Report and the associated Written Opinion for International Application No. PCT/IB2012/051710 dated Feb. 4, 2013.
PCT Demand (Form PCT/IPEA/401) for International Application No. PCT/IB2012/051710.
Notification of Receipt of Demand by Competent International Preliminary Examining Authority (Form PCT/IPEA/402) for International Application No. PCT/IB2012/051710 dated Feb. 11, 2013.
Second Written Opinion of the International Preliminary Examining Authority for International Application No. PCT/IB2012/051710 dated Mar. 7, 2013.
Response to the Second Written Opinion for International Application No. PCT/IB2012/051710 dated May 7, 2013.
Notification of Transmittal of the International Preliminary Report on Patentability (Form PCT/IPEA/416) for International Application No. PCT/IB2012/051710 dated May 16, 2013.
International Preliminary Report on Patentability (Form PCT/IPEA/409) for International Application No. PCT/IB2012/051710 dated May 16, 2013.

* cited by examiner

FLUIDIFIED INERT MATERIAL SPREADING DEVICE FOR BURYING AN UNDERWATER PIPELINE, AND METHOD OF SPREADING FLUIDIFIED INERT MATERIAL OVER AN UNDERWATER PIPELINE

PRIORITY CLAIM

This application is a national stage application of PCT/IB2012/051710, filed on Apr. 5, 2012, which claims the benefit of and priority to Italian Patent Application No. MI2011A 000556, filed on Apr. 5, 2011, the entire contents of which are each incorporated by reference herein.

BACKGROUND

Burying underwater pipelines in fluidified inert material is known from documents U.S. Pat. No. 4,352,590, PCT Patent Application No. WO 2005/005736, PCT Patent Application No. WO 2009/141409, U.S. Pat. No. 4,992,000, U.S. Pat. No. 4,334,801, U.S. Pat. No. 4,400,115 and U.S. Pat. No. 5,659,983. In WO 2009/141409, the pipeline is buried by fluidifying a tilled portion of the bed of the body of water underneath the pipeline. Though effective, this method has the drawback of dispersing particles of inert material in the water. Fluidifying the inert material causes the pipeline to sink into the bed of the body of water, but tilling the bed and forced fluidification in situ of the tilled inert material produce minute particles of inert material that take a long time to settle, and so pose various problems: poor coverage of the pipeline, resulting in a depression along the trench; and dispersion of inert material in the pipeline area, thus contaminating flora and fauna. If caught and transported by water currents, the inert material particles in the pipeline area may even be carried relatively long distances. In documents PCT Patent Application No. WO 2009/141409, U.S. Pat. Nos. 4,992,000, 4,334,801, 4,400,115 and 5,659,983, dispersion of the fluidified material is contained by releasing it inside a protective hood over the bed of the body of water.

These known solutions are only partly successful in preventing dispersion, on account of the hood being moved parallel to the pipeline, so convection sustaining the inert material particles still persists in the areas from which the hood is removed.

Regardless of dispersion of the fluidified inert material, known solutions also fail to ensure even coverage of the pipeline.

SUMMARY

The present disclosure relates to a spreading device configured to bury underwater pipelines in fluidified inert material.

It is an advantage of the present disclosure to provide a spreading device configured to more effectively contain dispersion of fluidified inert material particles, particularly in beds with certain types of geological structures, and to ensure even, complete coverage of the pipeline.

According to the present disclosure, there is provided a fluidified inert material spreading device configured to bury a pipeline in a body of water; the spreading device being configured to travel in the body of water in a travelling direction along and over the pipeline, and comprising a hull, which extends along a longitudinal axis, houses at least one expansion chamber for fluidified inert material, is connected to at least one feed port to feed the fluidified inert material to the expansion chamber, and has a quantity or number of outlet ports configured to release the fluidified inert material from the expansion chamber, close to the pipeline, and which as a whole define a flow cross section greater than the flow cross section of the feed port.

By virtue of the present disclosure, the expansion chamber reduces the speed and vorticity of the fluid, sheltered from external agents, and allows the particles to start settling and flow out of the outlet ports. And, the overall flow cross section of the outlet ports being much larger than the flow cross section of the feed port, the fluidified inert material flows out of the hull much more slowly than the fluidified inert material flows in.

The combination of these effects greatly reduces dispersion of the fluidified inert material particles.

In one embodiment of the disclosure, the hull comprises a bottom wall, and two side walls adjacent to the bottom wall; and the outlet ports are arranged along the bottom wall to divide and distribute the fluidified inert material better, and so cover the pipeline more evenly.

The present disclosure also relates to a method of spreading fluidified inert material over an underwater pipeline, configured to eliminate certain of the drawbacks of certain of the known art.

According to the present disclosure, there is provided a method of spreading fluidified inert material over a pipeline in a body of water, the method comprising the steps of moving a hull of a spreading device in the body of water in a travelling direction along and over the pipeline; feeding the fluidified inert material through a feed port into at least one expansion chamber; and releasing the fluidified inert material from the expansion chamber through a quantity or number of outlet ports, which define an overall flow cross section greater than the flow cross section of the feed port.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
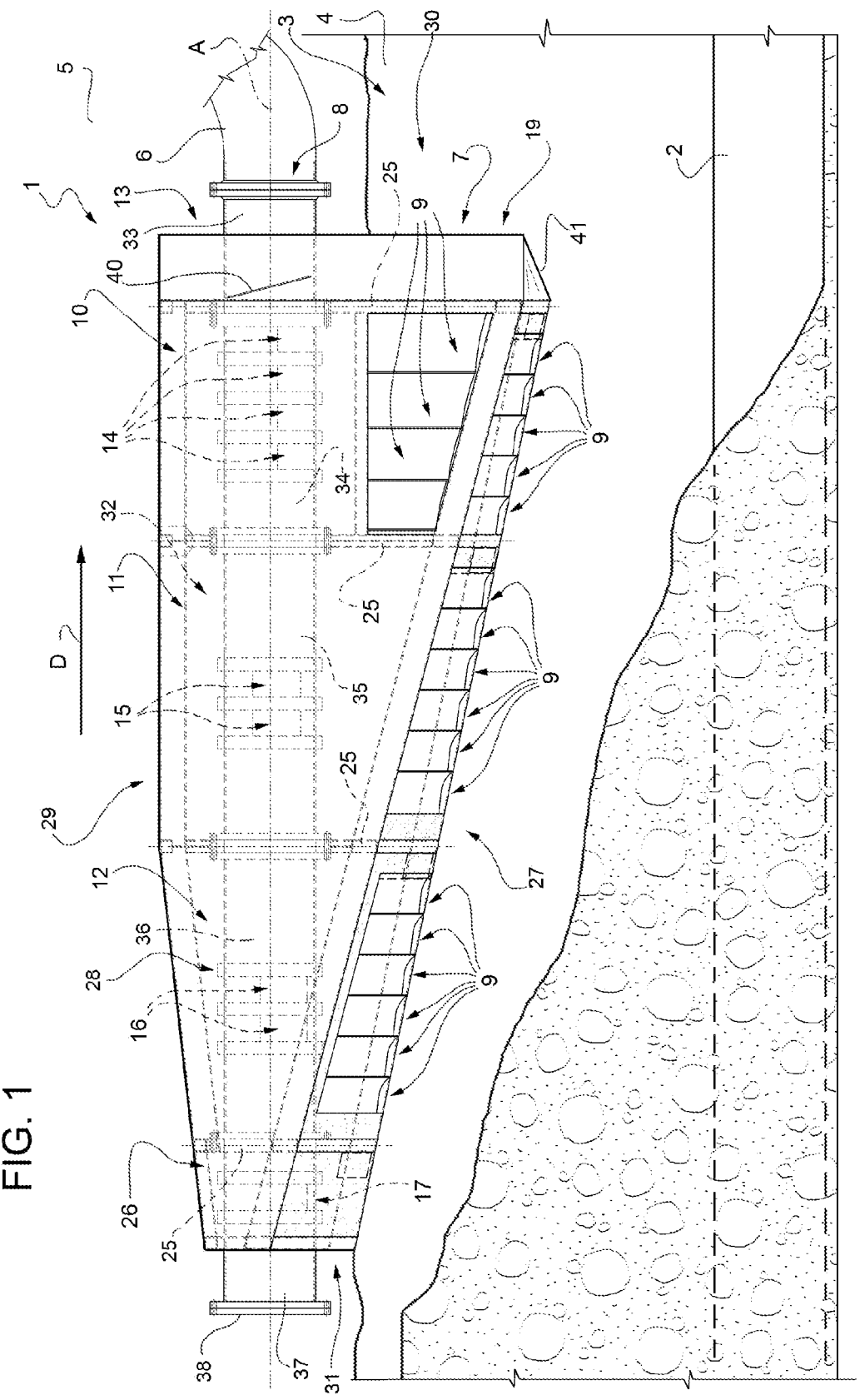
FIG. 1 shows a partly sectioned side view, with parts removed for clarity, of a spreading device in accordance with the present disclosure.

Referring now to the example embodiments of the present disclosure illustrated in FIGS. 1 to 4, number 1 in FIG. 1 indicates as a whole a spreading device configured to bury a pipeline 2, in particular a pipeline 2 inside a trench 3 formed in the bed 4 of a body of water 5.

Spreading device 1 is configured to move in a travelling direction D along and over pipeline 2, to release fluidified inert material over pipeline 2 and adequately fill trench 3, and is assisted by a support vessel (not shown in the drawings) which controls the spreading device and supplies the spreading device with fluidified inert material along, in at least one embodiment, a flexible line 6. Spreading device 1 may be mounted on a supporting structure (not shown in the drawings) resting on bed 4 of body of water 5, on either side of trench 3, and which may be mounted on drive wheels (not shown in the drawings) to drive spreading device 1 along bed 4, or on skids to tow spreading device 1 along bed 4. Alternatively, spreading device 1 may be supported by the support vessel, (e.g., utilizing an articulated quadrilateral system (not shown in the drawings)).

Spreading device 1 comprises a hull 7 extending along a longitudinal axis A and configured for full or partial immersion in body of water 5. Hull 7 is connected to a feed port 8 connectable hermetically to feed line 6, and has a quantity or number of outlet ports 9 configured to distribute fluidified inert material along a portion of trench 3. The overall flow cross section of outlet ports 9 is much larger than the flow cross section of feed port 8, and in one embodiment, the flow cross section of each outlet port 9 is much smaller than that of feed port 8. Hull 7 comprises at least one expansion chamber 10, and, in the example shown, three expansion chambers 10, 11, 12, each connected directly to a respective quantity or number of outlet ports 9. Spreading device 1 also comprises a flow distributor 13, which extends along axis A, mainly inside hull 7, and has openings 14, 15, 16, 17 spaced along axis A to distribute fluidified inert material inside expansion chambers 10, 11, 12.

Hull 7 increases in height and tapers in width along longitudinal axis A in travelling direction D.

Figure 4:
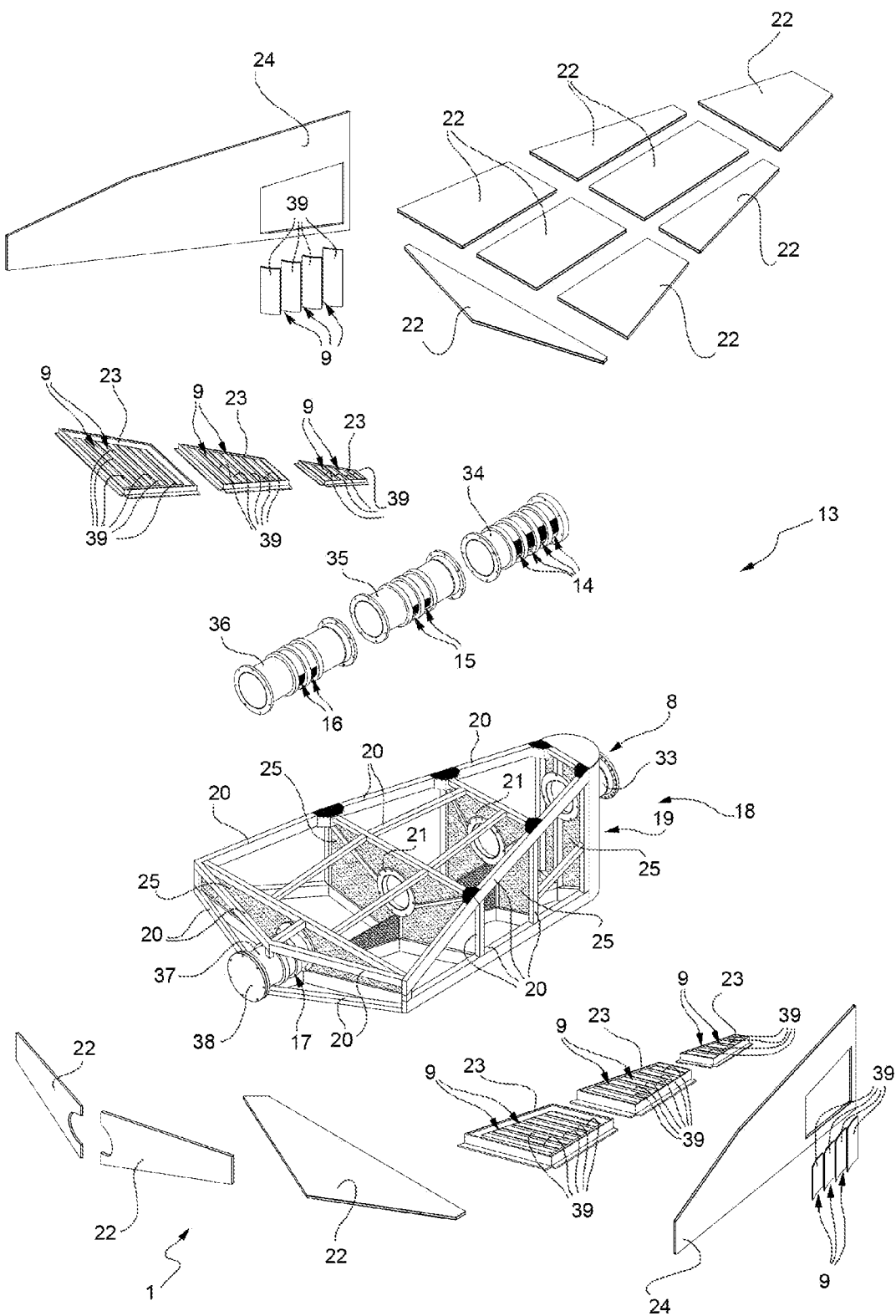
FIG. 4 shows an exploded view in perspective, with parts removed for clarity, of the FIG. 1 device.

With reference to FIG. 4, hull 7 comprises a frame 18 comprising a fore structure 19, beams 20, and rings 21 for connection to distributor 13; panels 22, 23, 24 fixed to frame 18 to form a closed inner compartment; and four partitions 25 installed inside the inner compartment to define the three expansion chambers 10, 11, 12 (FIG. 1) and separate expansion chamber 10 from fore structure 19 (FIG. 1), and expansion chamber 12 from an aft catch chamber 26 (FIG. 1). Panels 22 are substantially curtain panels, whereas panels 23, 24 have outlet ports 9.

Figure 2:
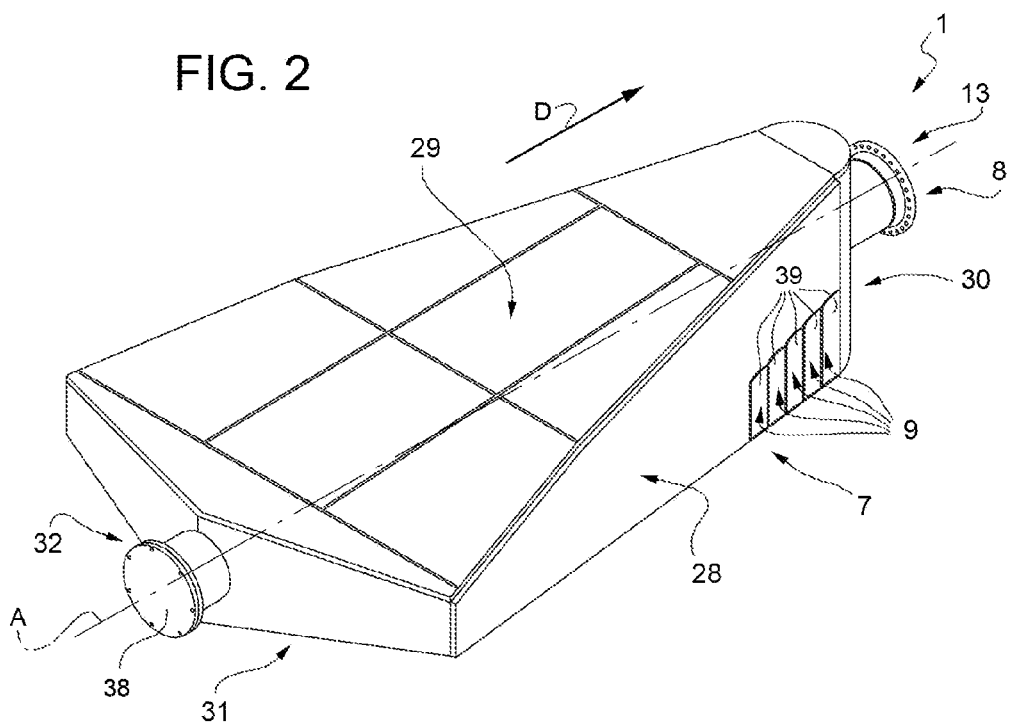
FIG. 2 shows a view in perspective, with parts removed for clarity, of the FIG. 1 spreading device.
Figure 3:
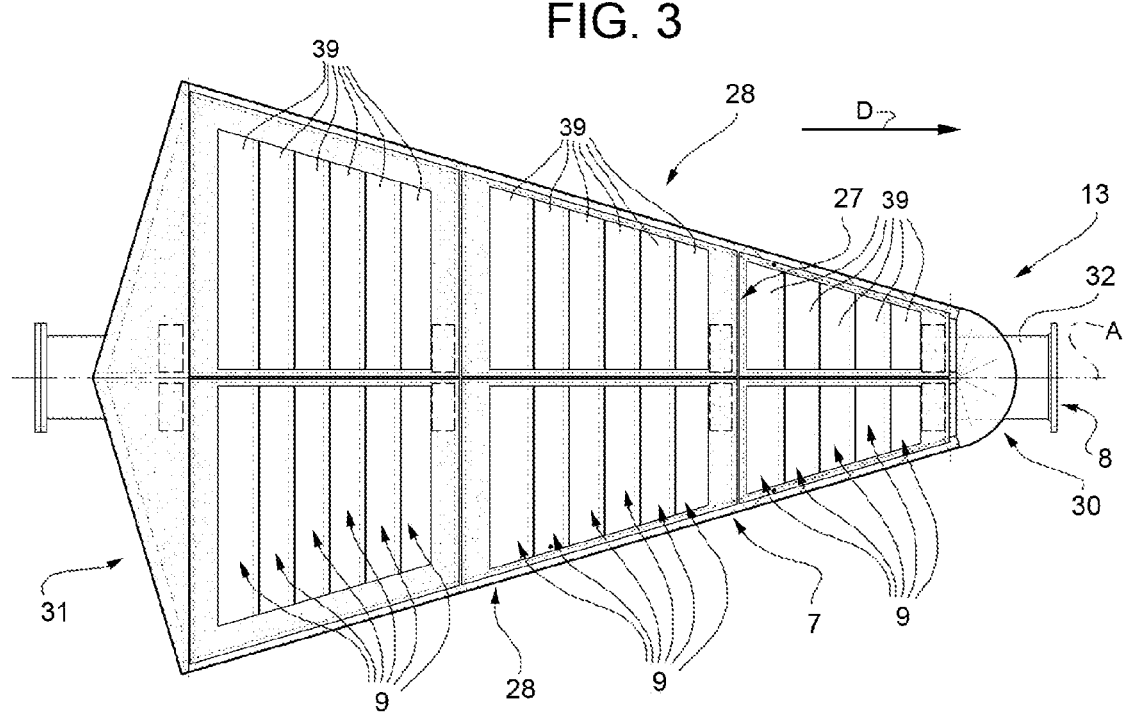
FIG. 3 shows an underside view, with parts removed for clarity, of the FIG. 1 device.

With reference to FIG. 3, hull 7 is substantially a closed casing, and comprises a bottom wall 27, two side walls 28 and, as shown in FIG. 2, a top wall 29, a fore wall 30, and an aft wall 31.

With reference to FIG. 1, flow distributor 13 combines with frame 18 (FIG. 4) to impart the necessary rigidity to spreading device 1, and comprises a pipe 32, which extends inside hull 7 and projects from the fore and aft ends of hull 7. With reference to FIG. 4, pipe 32 is connected rigidly to rings 21 of frame 18, and is, in one embodiment, made of aligned, connected pipe sections 33, 34, 35, 36, 37. From the fore to aft end, pipe section 33 extends partly inside the fore structure, projects from it with a flange for connection to feed line 6, and actually defines feed port 8. Pipe section 34 extends inside expansion chamber 10, and comprises four successive, downward-facing, sector-shaped openings 14, each extending to an angle of roughly 180 degrees. Pipe section 35 extends inside expansion chamber 11, and comprises four sector-shaped openings 15 arranged side by side in pairs and facing laterally. Pipe section 36 extends inside expansion chamber 12, and comprises four sector-shaped openings 16 arranged side by side in pairs and facing partly laterally and partly downwards. Pipe section 37 is located at aft catch chamber 26, comprises only one downward-facing opening 17, projects outwards of hull 7, and is sealed by a closed flange 38.

The configuration and quantity or number of openings 14, 15, 16, 17 along flow distributor 13 provide for distributing the fluidified inert material inside hull 7 and, in particular, expansion chambers 10, 11, 12.

With reference to FIG. 3, outlet ports 9 are located mainly along bottom wall 27, which, in use, faces pipeline 2 and the bottom of trench 3 (FIG. 1). With reference to FIG. 2, in this illustrated embodiment, outlet ports 9 also extend partly along side wall 28. With reference to FIG. 1, outlet ports 9 also extend along portions of side walls 28 which, in use, are at least partly located inside trench 3 (i.e., along the lowest part of side walls 28, close to the fore end of hull 7).

With reference to FIG. 4, outlet ports 9 are defined by a quantity or number of openings along panels 23 and/or 24. In the example shown, openings are formed along the whole of each panel 23, whereas the openings in each panel 24 are concentrated in a corner of panel 24, at the fore end of hull 7. The openings in panels 23 and 24 are variously defined. In the embodiment shown in the drawings, and particularly in FIG. 4, outlet ports 9 are defined by gaps between slats 39, which may be oriented to direct the flow of fluidified inert material in a preferential outflow direction. In the example shown, slats 39 are oriented to produce a downward outflow direction sloping in travelling direction D.

The fluidified inert material outflow direction from outlet ports 9 is also affected by the shape and orientation of bottom wall 27 and side walls 28. In the embodiment shown, diverging flows of fluidified inert material are produced by bottom wall 27 being humpbacked (i.e., flat panels 23 are inclined along a directrix) and by panels 24, partly defining side walls 28, converging towards the fore end.

With reference to FIG. 1, spreading device 1 also comprises a screen 40 configured to separate chunks over a designated or given size from the fluidified inert material, and which, in one embodiment, is located along flow distributor 13, between feed port 8 and openings 14. For this purpose, flow distributor 13 communicates, directly upstream from screen 40, with fore structure 19, which defines a bin for chunks of inert material exceeding the size of screen 40; and fore structure 19 has a hatch 41 releasable selectively to empty the bin periodically. The term 'directly upstream' refers to the direction in which fluidified inert material is fed to flow distributor 13, and which is substantially opposite the travelling direction D of spreading device 1.

In actual use, spreading device 1 moves through body of water 5, in travelling direction D, along and over pipeline 2, and releases fluidified inert material over pipeline 2 and into trench 3 in general. The fluidified inert material is fed through feed port 8 into expansion chambers 10, 11, 12, and is released from these through outlet ports 9 along all of expansion chambers 10, 11, 12, which serve to reduce the kinetic energy (i.e., vorticity) of the fluidified inert material. This effect on the fluidified inert material is achieved inside spreading device 1 (i.e., is substantially unaffected by current action and/or turbulence in the body of water 5 around spreading device 1). By reducing its vorticity, the fluidified inert material can be released from outlet ports 9 at the bottom of spreading device 1 much more slowly than it flows in, and its outflow direction can be controlled.

Outlet ports 9, being relatively small in cross section, shelter expansion chambers 10, 11, 12 from any turbulence in the surrounding body of water 5, and, their total flow cross section being much larger than the flow cross section of feed port 8, maintain a relatively slow outflow speed of the fluidified inert material from expansion chambers 10, 11, 12.

In one embodiment, fluidified inert material flow is oriented by the configuration of outlet ports 9. More specifically, the humpback configuration of bottom wall 27, along which most of outlet ports 9 are located, directs fluidified inert material in diverging directions, substantially onto the side walls of trench 3.

The position of slats 39 also orients fluidified inert material flow, and, in the example shown, imparts to the flow a component parallel to travelling direction D.

The fluidified inert material is distributed in expansion chambers 10, 11, 12 along the longitudinal axis. In the example shown, feed port 8 is located at the fore end of hull 7, and flow is distributed from the fore to the aft end (i.e., in the opposite direction to travelling direction D). Distributing flow aids in reducing turbulence, by reducing inflow speed into expansion chambers 10, 11, 12. The quantity or number of expansion chambers 10, 11, 12 also plays a role in reducing turbulence; the shape and size of each expansion chamber 10, 11, 12 aid in reducing vorticity; and part of the kinetic energy of the fluidified inert material flow is absorbed by hull 7 and partitions 25.

By combining flow distributor 13 and expansion chambers 10, 11, 12, each expansion chamber 10, 11, 12 can be supplied with a controlled amount of fluidified inert material. In certain embodiments, the fluidified inert material is distributed in decreasing amounts along longitudinal axis A, in the opposite direction to travelling direction D. That is, expansion chamber 10 receives more fluidified inert material than expansion chamber 11, which in turn receives more than expansion chamber 12. As it advances through body of water 5, spreading device 1 is kept partly inside trench 3. More specifically, the front of spreading device 1 is located inside trench 3, such that outlet ports 9 associated with expansion chamber 10 are located almost entirely inside trench 3, thus sheltering the fluidified inert material released from these outlet ports 9 from any turbulence in body of water 5. The outlet ports 9 associated with expansion chambers 11 and 12 are located on average above bed 4 of body of water 5, to release fluidified inert material on top of that already deposited inside trench 3 from expansion chamber 10, i.e., bottom wall 27 of spreading device 1 as a whole is kept tilted with respect to pipeline 2, and in particular converges with the pipeline in travelling direction D, so outlet ports 9 along longitudinal axis A more or less follow the contour of the fluidified inert material deposited inside trench 3, and the distance between each outlet port 9 and the fluidified inert material already deposited is maintained more or less constant, at least as regards all the outlet ports 9 along bottom wall 27.

This configuration reduces the risk of fluidified inert material dispersing in body of water 5, by making the path of the fluidified inert material substantially independent of the fill level of trench 3, and also provides for better filling trench 3.

The flow of fluidified inert material is also screened to prevent large chunks of inert material from accessing expansion chambers 10, 11, 12.

Clearly, changes may be made to the embodiment of the present disclosure described without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

More specifically, the expansion chambers may number other than three, as in the illustrated embodiment described, depending on the shape and depth of the trench, and, more generally speaking, on the amount of inert material needed to fill the trench.

The invention claimed is:

1. A fluidified inert material spreading device configured to travel in a body of water in a travelling direction along and over a pipeline, the fluidified inert material spreading device comprising:
- a hull including a bottom wall and two side walls adjacent to the bottom wall, said hull:
  - extends along a longitudinal axis,
  - houses at least one expansion chamber for fluidified inert material,
  - is connected to at least one feed port configured to feed the fluidified inert material to the at least one expansion chamber, and
  - has a plurality of outlet ports:
    - configured to release the fluidified inert material from the at least one expansion chamber to an area close to the pipeline, and
    - which collectively define a flow cross section greater than a flow cross section of the at least one feed port, wherein at least one of the outlet ports is arranged along the bottom wall.

2. The fluidified inert material spreading device of claim 1, wherein at least one of the outlet ports is arranged along the side walls.

3. The fluidified inert material spreading device of claim 1, wherein the bottom wall is humpbacked, with respect to a directrix, to orient the plurality of outlet ports to produce an outflow of the fluidified inert material in diverging directions.

4. A fluidified inert material spreading device configured to travel in a body of water in a travelling direction along and over a pipeline, the fluidified inert material spreading device comprising:
- a hull which:
  - extends along a longitudinal axis,
  - houses at least one expansion chamber for fluidified inert material,
  - is connected to at least one feed port configured to feed the fluidified inert material to the at least one expansion chamber, and
  - has a plurality of outlet ports:
    - configured to release the fluidified inert material from the at least one expansion chamber to an area close to the pipeline, and
    - which collectively define a flow cross section greater than a flow cross section of the at least one feed port, wherein each of the outlet ports has a flow cross section smaller than the flow cross section of the at least one feed port.

5. A fluidified inert material spreading device configured to travel in a body of water in a travelling direction along and over a pipeline, the fluidified inert material spreading device comprising:
- a hull which:
  - extends along a longitudinal axis,
  - houses at least one expansion chamber for fluidified inert material,
  - is connected to at least one feed port configured to feed the fluidified inert material to the at least one expansion chamber, and
  - has a plurality of outlet ports:
    - configured to release the fluidified inert material from the at least one expansion chamber to an area close to the pipeline, and
    - which collectively define a flow cross section greater than a flow cross section of the at least one feed port, and
- a flow distributor extending along the longitudinal axis and including a free end defining the at least one feed port at a fore end of the hull and a plurality of openings arranged along the longitudinal axis and configured to distribute the flow of the fluidified inert material inside the hull along the longitudinal axis.

6. The fluidified inert material spreading device of claim 5, which includes a screen located along a conduit between the at least one feed port and the plurality of openings to separate, from the flow of the fluidified inert material, any chunks of the fluidified inert material greater than a designated size.

7. The fluidified inert material spreading device of claim 6, wherein the flow distributor communicates with a bin, upstream from the screen, for any chunks of fluidified inert material greater than the designated size.

8. A method of spreading fluidified inert material over a pipeline in a body of water, the method comprising:
   moving a hull of a spreading device in the body of water in a travelling direction along and over the pipeline;
   feeding the fluidified inert material through a feed port to distribute the fluidified inert material in the at least one expansion chamber of the hull along a longitudinal axis, such that a distributed amount of the fluidified inert material decreases along the longitudinal axis in an opposite direction to the travelling direction; and
   releasing the fluidified inert material from the at least one expansion chamber through a plurality of outlet ports, which define an overall flow cross section greater than a flow cross section of the feed port.

9. A method of spreading fluidified inert material over a pipeline in a body of water, the method comprising:
   moving a hull of a spreading device in the body of water in a travelling direction along and over the pipeline, wherein the hull includes a bottom wall including a plurality of outlet ports and moving the hull includes keeping the bottom wall tilted with respect to the pipeline, and substantially converging with the pipeline in the travelling direction;
   feeding the fluidified inert material through a feed port into at least one expansion chamber of the hull; and
   releasing the fluidified inert material from the at least one expansion chamber through the plurality of outlet ports which define an overall flow cross section greater than a flow cross section of the feed port.

\* \* \* \* \*